(12) United States Patent
Kang et al.

(10) Patent No.: US 10,805,518 B2
(45) Date of Patent: Oct. 13, 2020

(54) ELECTRONIC DEVICE FOR OBTAINING SECURITY IMAGE USING SECURITY PROCESSING MODULE

(71) Applicant: Samsung Electronics Co., Ltd., Suwon-si, Gyeonggi-do (KR)

(72) Inventors: Hwayong Kang, Suwon-si (KR); Hyunho Shin, Suwon-si (KR); Donghyun Yeom, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/382,958

(22) Filed: Apr. 12, 2019

(65) Prior Publication Data

US 2019/0320110 A1 Oct. 17, 2019

(30) Foreign Application Priority Data

Apr. 12, 2018 (KR) .................. 10-2018-0042879

(51) Int. Cl.
| | |
|---|---|
| *H04N 5/232* | (2006.01) |
| *H04N 5/225* | (2006.01) |
| *H04N 5/33* | (2006.01) |
| *G06K 9/00* | (2006.01) |
| *G06F 21/32* | (2013.01) |

(52) U.S. Cl.
CPC ....... *H04N 5/23216* (2013.01); *H04N 5/2256* (2013.01); *H04N 5/332* (2013.01); *G06K 9/00604* (2013.01)

(58) Field of Classification Search
CPC .. H04N 5/23216; H04N 5/2256; H04N 5/332; H04N 5/33; G06K 9/00604; B60G 2401/14; B60R 21/01534; G01N 2203/0641; G01N 2223/509
See application file for complete search history.

(56) References Cited

U.S. PATENT DOCUMENTS

| | | | |
|---|---|---|---|
| 2002/0136435 A1* | 9/2002 | Prokoski ............ | G06K 9/00906 382/118 |
| 2008/0223925 A1 | 9/2008 | Saito et al. | |
| 2013/0222564 A1* | 8/2013 | Park ..................... | H04N 5/2354 348/77 |
| 2014/0099005 A1* | 4/2014 | Mogi .................. | G06K 9/00288 382/118 |
| 2015/0319169 A1 | 11/2015 | Cronin | |

(Continued)

*Primary Examiner* — Alexander Gee

(57) ABSTRACT

An electronic device is provided. The electronic device includes an image sensor module for obtaining a security image or a non-security image using a first group pixel and a second group pixel and a processor including a security processing module and a non-security processing module electrically connected with the image sensor module. The processor is configured to receive a first user input, enable the security processing module, determine whether the image sensor module is enabled using the enabled security processing module, when the image sensor module is enabled, at least temporarily block reception of an image from the image sensor module, when the image sensor module is disabled, enable the image sensor module using the enabled security processing module, request the image sensor module to obtain the security image for the external object, and receive the security image for the external object, obtained from the image sensor module.

20 Claims, 8 Drawing Sheets

(56) References Cited

U.S. PATENT DOCUMENTS

| | | | |
|---|---|---|---|
| 2016/0164865 A1 | 6/2016 | Speicher et al. | |
| 2016/0261824 A1* | 9/2016 | Scalisi | G08B 13/19636 |
| 2017/0039411 A1* | 2/2017 | Ono | G06K 9/00255 |
| 2017/0195640 A1* | 7/2017 | Pasternak | H04N 7/188 |
| 2017/0289443 A1* | 10/2017 | Nguyen | G06F 9/4401 |
| 2019/0122531 A1* | 4/2019 | Harris | H04N 5/23238 |

* cited by examiner

ELECTRONIC DEVICE FOR OBTAINING SECURITY IMAGE USING SECURITY PROCESSING MODULE

CROSS-REFERENCE TO RELATED APPLICATIONS

This application is based on and claims priority under 35 U.S.C. § 119 to Korean Patent Application No. 10-2018-0042879, filed on Apr. 12, 2018, in the Korean Intellectual Property Office, the disclosure of which is incorporated by reference herein its entirety.

BACKGROUND

1. Field

The disclosure relates to an electronic device including an image sensor module.

2. Description of Related Art

Various types of electronic devices, each of which includes an image sensor module, for example, a camera, have come into wide use. Each of electronic devices may perform various functions using its image sensor module. For example, the electronic device may obtain a non-security image for any object using a non-security image sensor module. For another example, the electronic device may obtain a security image for iris recognition by means of an image sensor module for security, which uses the light of an infrared band.

An image sensor module for security, including different types of pixels, is proposed. The image sensor module for security may perform a variety of functions using the different types of pixels. For example, the image sensor module for security may perform a depth sensing function other than iris recognition.

In connection with operating the image sensor module for security, an operation which needs security, such as iris recognition, may be performed by only the control of a trust zone (or a security processing module) in a processor. The trust zone may be a space independently separated in the processor, and access to the trust zone may be limited at a normal zone (or a non-security processing module) in the processor.

The above information is presented as background information only to assist with an understanding of the present disclosure. No determination has been made, and no assertion is made, as to whether any of the above might be applicable as prior art with regard to the present disclosure.

SUMMARY

An image sensor module for security may perform the above-mentioned various functions. However, because the image sensor module for security is able to perform control in only a trust zone of a processor, the utility thereof may be decreased. For example, because the image sensor module for security is unable to perform control in a non-security zone, a normal application rather than an application for security may fail to operate a depth sensing function.

When allowing a normal zone of the processor to control the image sensor module for security to increase the utility of the image sensor module for security, security may be vulnerable. For example, when the normal zone is hacked, a security image capable of being obtained by an image sensor for security may also be hacked.

Aspects of the present disclosure are to address at least the above-mentioned problems and/or disadvantages and to provide at least the advantages described below. Accordingly, an aspect of the disclosure is to provide an electronic device for addressing the above-mentioned problems and issues raised in the disclosure.

In accordance with an aspect of the present disclosure, an electronic device is provided. An electronic device may include an image sensor module configured to include a first group pixel capable of obtaining data corresponding to a first wavelength band and a second group pixel capable of obtaining data corresponding to a second wavelength band and obtain a security image or a non-security image using the first group pixel and the second group pixel and a processor configured to include a security processing module and a non-security processing module, which are electrically connected with the image sensor module. The processor may be configured to receive a first user input for requesting to obtain the security image for an external object by means of a first application, enable the security processing module based on the received first user input, determine whether the image sensor module is enabled using the enabled security processing module, as a result of the determination that the image sensor module is enabled, at least temporarily block reception of an image from the image sensor module, and, as a result of the determination that the image sensor module is disabled, enable the image sensor module using the enabled security processing module, request the image sensor module to obtain the security image for the external object, and receive the security image for the external object, the security image being obtained from the image sensor module.

In accordance with another aspect of the present disclosure, an electronic device is provided. An electronic device may include an image sensor module configured to include a first group pixel capable of obtaining data corresponding to a first wavelength band and a second group pixel capable of obtaining data corresponding to a second wavelength band and obtain a security image or a non-security image using the first group pixel and the second group pixel and a processor configured to include a security processing module and a non-security processing module, which are electrically connected with the image sensor module. The image sensor module may be configured to receive a specified signal for obtaining a security image for an external object from the processor, determine whether the security processing module is enabled, based on the received specified signal, as a result of the determination that the security processing module is enabled, obtain the security image for the external object and deliver the obtained security image to the security processing module, and, as a result of the determination that the security processing module is disabled, refrain from obtaining the security image for the external object.

Other aspects, advantages, and salient features of the disclosure will become apparent to those skilled in the art from the following detailed description, which, taken in conjunction with the annexed drawings, discloses various embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
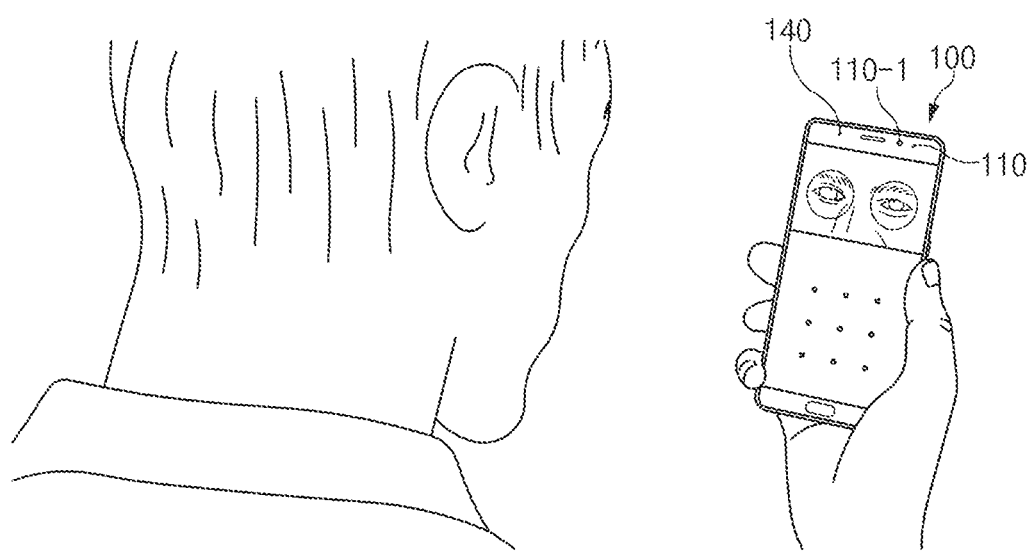
FIG. 1 illustrates an electronic device including an image sensor module according to an embodiment.

FIG. 1 illustrates an electronic device including an image sensor module according to an embodiment.

Referring to FIG. 1, an electronic device 100 may obtain an image for an external object, for example, a part of a user's body. For example, the electronic device 100 may obtain an image for an iris of the user. In an embodiment, the image for the iris may be used for security. For example, the image for the iris may be used for authenticating whether the user is a legitimate (or authorized) user. When it is authenticated that the user is the legitimate user, a screen is unlocked or an operation of a payment function in a payment application may be permitted.

According to an embodiment, a plurality of modules may be arranged in a front surface of the electronic device 100. For example, a first camera module 110, a second camera module 110-1, a light source unit 140, or the like may be arranged in the front surface of the electronic device 100. In an embodiment, the first camera module 110 may be the image sensor module 110 for security, and the second camera module 110-1 may be the non-security image sensor module 110-1.

According to an embodiment, the electronic device 100 may obtain a non-security image which is not used for security, using the non-security image sensor module 110-1 and may obtain a security image used for security, using the image sensor module 110 for security. The security image may be an image associated with personal information. The security image may be an image including, for example, a characteristic of an iris, fingerprint, or face of the user.

According to an embodiment, the electronic device 100 may obtain the non-security image using the image sensor module 110 for security. For example, the electronic device 100 may obtain a non-security image including depth information of an external object using the image sensor module 110 for security. The electronic device 100 may obtain a three-dimensional (3D) image of the external object using the depth information.

According to an embodiment, the light source unit 140 may emit an infrared ray of a specified wavelength band for image capture of the image sensor module 110 for security. In an embodiment, when the light source unit 140 emits the infrared ray of the specified wavelength band, the infrared ray may be reflected from the external object, for example, the iris of the user, and may then be incident to the image sensor module 110 for security. The image sensor module 110 for security may obtain a security image corresponding to the iris from the incident infrared ray.

In the disclosure, the details described with reference to FIG. 1 are also applicable to a configuration having the same reference denotations as that of the electronic device 100 shown in FIG. 1.

Figure 2:
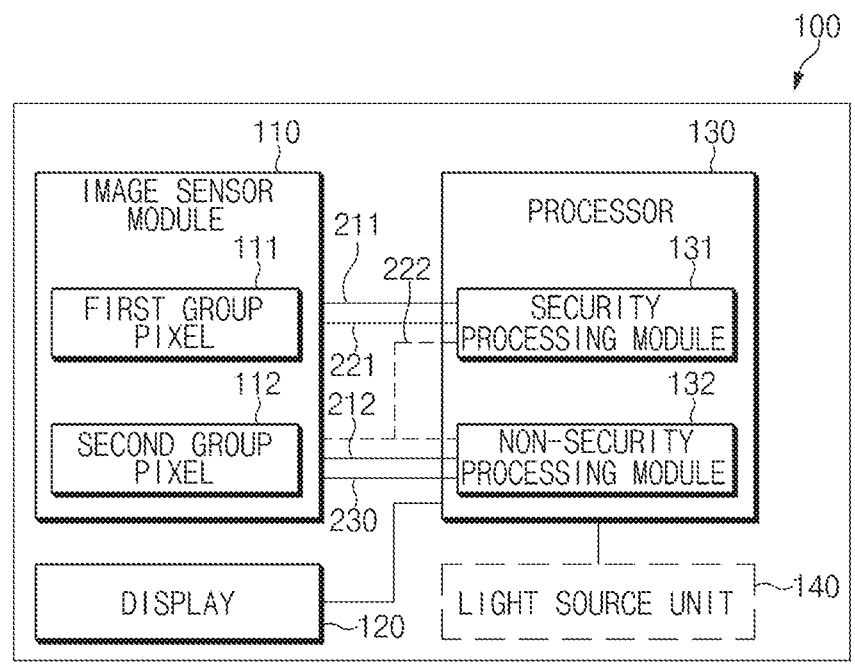
FIG. 2 illustrates a block diagram of an electronic device according to an embodiment.

FIG. 2 illustrates a block diagram of an electronic device according to an embodiment.

Figure 7:
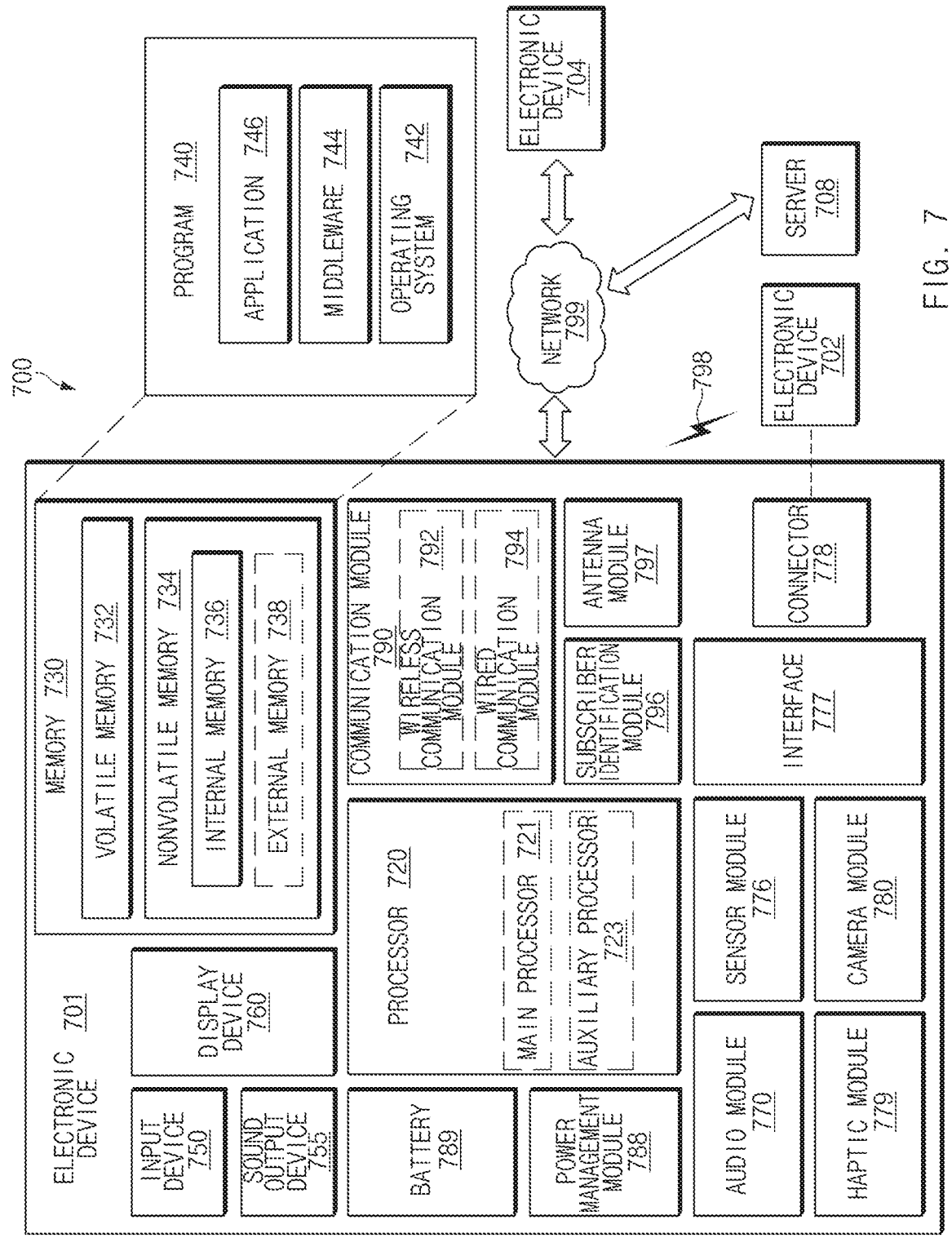
FIG. 7 illustrates a block diagram of an electronic device in a network environment, according to various embodiments.

Referring to FIG. 2, an electronic device 100 (e.g., an electronic device 701 of FIG. 7) may include an image sensor module 110 (e.g., a camera module 780 of FIG. 7) and a processor 130 (e.g., a processor 720 of FIG. 7). According to various embodiments, the electronic device 100 may further include another component other than the components shown in FIG. 2 or may omit some of the components shown in FIG. 2. For example, the electronic device 100 may further include a display 120 (e.g., a display device 760 of FIG. 7). For another example, the electronic device 100 may further include a light source unit 140. For another example, the electronic device 100 may further include a separate image sensor module (e.g., a second camera module 110-1 of FIG. 1), independent of the image sensor module 110, capable of obtaining a non-security image.

In the disclosure, the image sensor module 110 may be a first camera module 110 shown in FIG. 1, that is, the image sensor module for security (e.g., an auxiliary processor 723 of FIG. 7). According to an embodiment, the image sensor module 110 may include a first group pixel 111 and a second group pixel 112. According to various embodiments, the first group pixel 111 may obtain data (or image data) corresponding to a first wavelength band, and the second group pixel 112 may obtain data (or image data) corresponding to a second wavelength band. In an embodiment, the first wavelength band and the second wavelength band may differ from each other. For example, the first wavelength band may include a wavelength of 850 nm, and the second wavelength band may include a wavelength of 940 nm.

The image sensor module 110 may obtain a security image or a non-security image using the first group pixel 111 and/or the second group pixel 112. For example, the image sensor module 110 may obtain the security image at least using the first group pixel 111 and may obtain the non-security image at least using the second group pixel 112.

The security image may be data which needs security, for example, data including information indicating a personal characteristic of the user. For example, the security image may include an image for an iris or fingerprint of the user.

The non-security image may fail to include data which needs security. In an embodiment, the non-security image may include only depth information about an object. For example, the non-security image may be a 3D image for an unspecified thing rather than the user.

The processor 130 may be electrically connected with the components included in the electronic device 100 and may execute computation or data processing about control and/or communication of the components included in the electronic device 100. For example, the processor 130 may control the image sensor module 110 to obtain an image for an external object.

According to an embodiment, the processor 130 may include a security processing module 131 and a non-security processing module 132. In an embodiment, the security processing module 131 and the non-security processing module 132 may be areas which are physically or logically divided. In an embodiment, the security processing module 131 may deliver data to the non-security processing module 132 or may directly access data obtained by the non-security processing module 132. For example, the security processing module 131 may control the non-security processing module 132 to deliver a signal for obtaining a security image to the image sensor module 110. In an embodiment, the non-security processing module 132 may fail to directly access data obtained by the security processing module 131. In other words, access to the security processing module 131 from the outside may be limited.

According to an embodiment, the security processing module 131 may process data which needs security. For example, the security processing module 131 may perform processing for authenticating a legitimate (or authorized) user in a payment application, for example, iris recognition or fingerprint recognition.

According to an embodiment, the security processing module 131 may control, computation, or processing associated with obtaining a security image. For example, the security processing module 131 may request the image sensor module 110 to obtain a security image and may deliver information about an image capture condition for the security image, for example, brightness, a focal distance, a shutter speed, or the like, to the image sensor module 110. For another example, the security processing module 131 may compare the security image obtained by the image sensor module 110 with an image previously stored in a memory of the electronic device 100 to measure or determine similarity between the images.

According to an embodiment, the non-security processing module 132 may process non-security data which does not need security. For example, the non-security processing module 132 may execute a normal application for obtaining a 3D image for an object or editing the obtained image.

According to an embodiment, the non-security processing module 132 may perform control, computation, or processing associated with obtaining a non-security image. For example, the non-security processing module 132 may request the image sensor module 110 to obtain a non-security image and may deliver information about an image capture condition for the non-security image, for example, brightness, a focal distance, a shutter speed, or the like, to the image sensor module 110.

According to an embodiment, the non-security processing module 132 may perform control, computation, or processing associated with a security image based on control or a command of the security processing module 131. For example, the non-security processing module 132 may receive information associated with obtaining a security image, for example, information indicating whether to request to obtain the security image or information about an image capture condition, from the security processing module 131, and may deliver the received information to the image sensor module 110.

According to various embodiments, respective components (e.g., the image sensor module 110 and the processor 130) included in the electronic device 100 may transmit and receive specified information or a specified signal therebetween through a specified interface. According to various embodiments, the specified interface may include a control interface 230, data interfaces 211 and 212, or state interfaces 221 and 222.

According to an embodiment, the electronic device 100 may include the control interface 230 which electrically connects the processor 130 and the image sensor module 110. For example, the electronic device 100 may include the control interface 230 which electrically connects between the non-security processing module 132 and the image sensor module 110. For another example, the electronic device 100 may further include a separate control interface which electrically connects between the security processing module 131 and the image sensor module 110. The control interface 230 may be a unidirectional interface for transmitting a signal associated with controlling an image sensor. The control interface 230 may be, for example, an inter-integrated circuit ($I^2C$).

According to an embodiment, the security processing module 131 and the non-security processing module 132 may enable or disable the image sensor module 110 using the control interface 230. For example, the non-security processing module 132 may directly enable the image sensor module 110 using the control interface 230 to obtain a non-security image. For another example, the security processing module 131 may enable the image sensor module 110 via the non-security processing module 132 using the control interface 230 to obtain a security image. For another example, the security processing module 131 may directly enable or disable the image sensor module 110 using the separate control interface.

According to an embodiment, the security processing module 131 and the non-security processing module 132 may deliver information about the image capture condition to the image sensor module 110 using the control interface 230. The information about the image capture condition may include information about, for example, a type of an image (a security image or a non-security image), brightness of the image, a focal distance, a shutter speed, or the like. The image sensor module 110 may obtain an image based on the delivered information about the image capture condition.

According to an embodiment, the electronic device 100 may include the data interfaces 211 and 212 which electrically connect the processor 130 and the image sensor module 110. For example, the electronic device 100 may include the first data interface 211 which electrically connects the security processing module 131 and the image sensor module 110 and the second data interface 212 which electrically connects the non-security processing module 132 and the image sensor module 110. The data interfaces 211 and 212 may be unidirectional interfaces for transmitting an image obtained from an image sensor to the processor 130. For example, the security processing module 131 may receive a security image obtained by the image sensor module 110 using the first data interface 211, and the non-security processing module 132 may receive a non-security image obtained by the image sensor module 110 using the second data interface 212. Each of the data interfaces 211 and 212 may be, for example, a mobile industry processor interface (MIPI).

According to an embodiment, the electronic device 100 may include the first state interface 221 which electrically connects the security processing module 131 and the image sensor module 110. The first state interface 221 may be a bidirectional interface for identifying a state between the security processing module 131 and the image sensor module 110. The first state interface 221 may be, for example, a general-purpose input/output (GPIO).

According to an embodiment, the security processing module 131 may determine whether the image sensor module 110 is enabled using the first state interface 221. For example, when an electrical signal received via the first state interface 221 is high or at a rising edge, the security processing module 131 may determine that the image sensor module 110 is enabled. For another example, when the electrical signal received via the first state interface 221 is low or at a falling edge, the security processing module 131 may determine that the image sensor module 110 is disabled.

According to an embodiment, the image sensor module 110 may determine whether the security processing module 131 is enabled using the first state interface 221. For example, when an electrical signal received via the first state interface 221 is high or at a rising edge, the image sensor module 110 may determine that the security processing module 131 is enabled. For another example, when the electrical signal received via the first state interface 221 is low or at a falling edge, the image sensor module 110 may determine that the security processing module 131 is disabled.

According to an embodiment, the electronic device 100 may further include the second state interface 222 which electrically connects the non-security processing module 132, the security processing module 131, and the image sensor module 110. In an embodiment, the processor 130 may determine whether the image sensor module 110 is enabled in parallel via the first state interface 221 and the second state interface 222. For example, the processor 130 may compare an electrical signal obtained via the first state interface 221 by the security processing module 131, an electrical signal obtained via the second state interface 222 by the security processing module 131, and an electrical signal obtained via the second state interface 222 by the non-security processing module 132 to determine whether the image sensor module 110 is enabled in parallel.

According to an embodiment, the electronic device 100 may further include the display 120. The display 120 may output at least one content or item (e.g., a text, an image, a video, an icon, a widget, a symbol, or the like). The display 120 may include, for example, a liquid crystal display (LCD), a light-emitting diode (LED) display, an organic LED (OLED) display, a microelectromechanical systems (MEMS) display, an electronic paper display, or a rollable display.

According to an embodiment, the display 120 may receive specified image data from the processor 130 and may output corresponding content. For example, when the image sensor module 110 is unable to obtain a security image, the display 120 may receive specified image data from the processor 130 and may output content which displays occurrence of an error.

According to an embodiment, the electronic device 100 may further include the light source unit 140. The light source unit 140 may emit an infrared ray of a specified wavelength band to the outside. For example, the light source unit 140 may emit an infrared ray which has a first wavelength, for example, a wavelength of 850 nm, at which the first group pixel 111 obtains data (or image data).

According to an embodiment, the light source unit 140 may be electrically connected with the security processing module 131 to be enabled or disabled based on control of the security processing module 131. For example, only when the acquisition of the security image is requested legitimately (or validly), the security processing module 131 may enable the light source unit 140. When the light source unit 140 is not enabled by the security processing module 131, the image sensor module 110 may refrain from obtaining the security image. As a result, although the non-security processing module 132 is hacked, the electronic device 100 may refrain from obtaining the security image using the image sensor module 110.

In the disclosure, the details described with reference to FIG. 2 are also applicable to a configuration having the same reference denotations as that of the electronic device 100 shown in FIG. 2.

Figure 3:
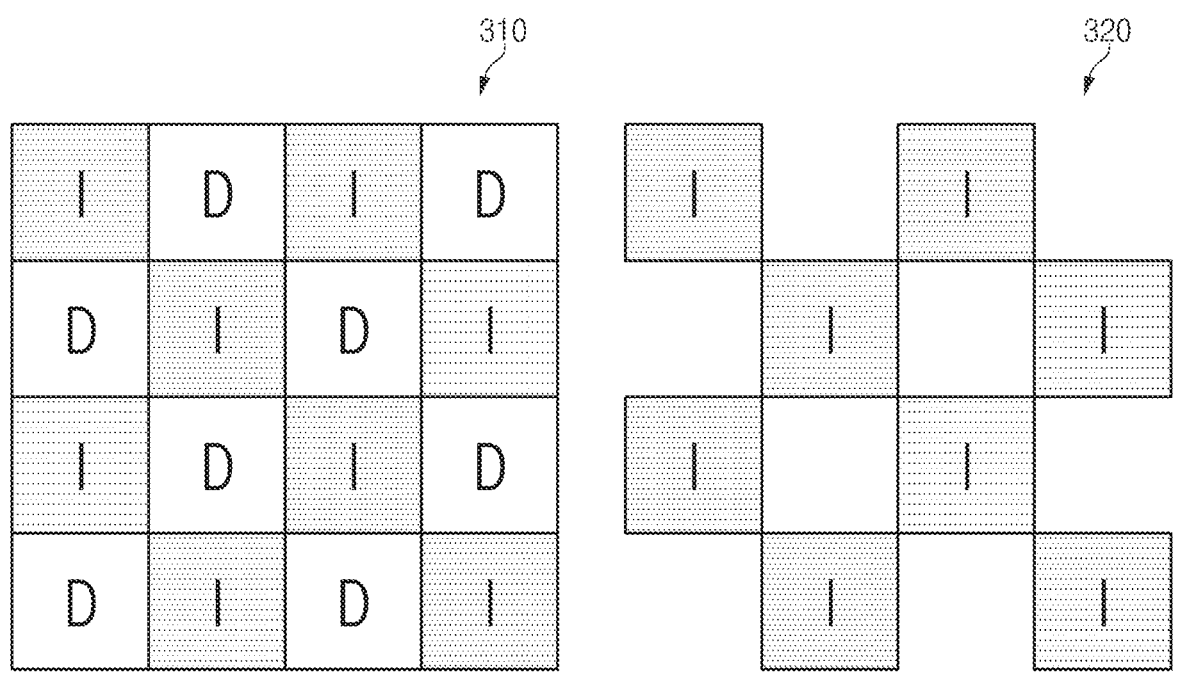
FIG. 3 illustrates pixel characteristics of a security image according to various embodiments.

FIG. 3 illustrates pixel characteristics of a security image according to various embodiments.

Referring to FIG. 3, pixel characteristics of a first security image 310 and pixel characteristics of a second security image 320 are shown. According to various embodiments, a security image may be obtained using a first group pixel (e.g., a first group pixel 111 of FIG. 2) and/or a second group pixel (e.g., a second group pixel of FIG. 2). In an embodiment, the first group pixel 111 may obtain data (or image data) using an infrared ray of a first wavelength band, and the second group pixel 112 may obtain data (or image data) using an infrared ray of a second wavelength band.

According to an embodiment, the data obtained by the first group pixel 111 and the data obtained by the second group pixel 112 may have different characteristics. For example, the data obtained by the first group pixel 111 may be data which needs security, for example, data including information of an iris. The data obtained by the second group pixel 112 may be data which does not need security, for example, data including depth information of an object. In the disclosure, as shown in FIG. 3, data which needs security may be indicated by I and data which does not need security may be indicated by D.

According to an embodiment, the security image may include data obtained by the at least first group pixel 111. For example, an image sensor module 110 of FIG. 2 may obtain a security image having the same or similar pixel characteristics to the first security image 310. The first security image 310 may be a security image obtained using both the first group pixel 111 and the second group pixel 112. For another example, the image sensor module 110 may obtain a security image having the same or similar pixel characteristics to a second security image 320. The second security image 320 may be a security image obtained using the first group pixel 111.

According to an embodiment, the image obtained by the first group pixel 111 may include information about an iris, and the image obtained by the second group pixel 112 may include depth information about at least a portion of a face. According to an embodiment, obtaining the first security image 310, the electronic device 100 may authenticate a user using the information about the iris and the depth information. According to another embodiment, obtaining the second security image 320, the electronic device 100 may authenticate the user using only the information about the iris.

Figure 4:
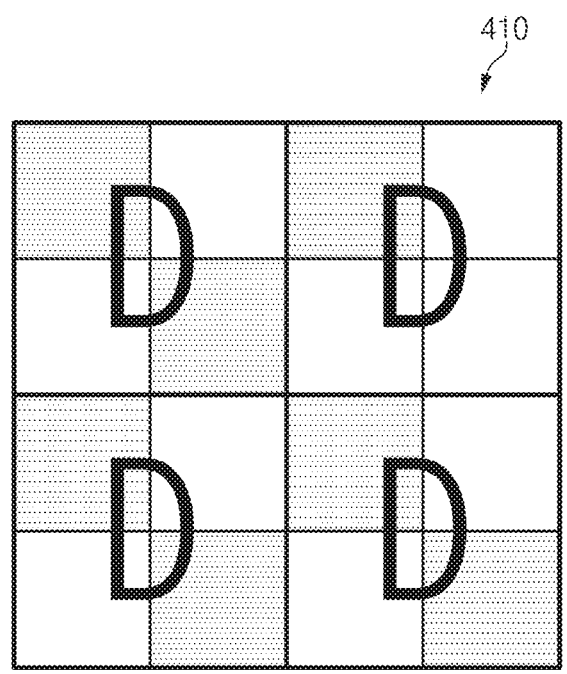
FIG. 4 illustrates pixel characteristics of a non-security image according to an embodiment.

FIG. 4 illustrates characteristics of pixels of a non-security image according to an embodiment.

Referring to FIG. 4, pixel characteristics of a non-security image 410 are shown. According to an embodiment, the non-security image 410 may be obtained using a first group pixel (e.g., a first group pixel 111 of FIG. 2) and a second group pixel (e.g., a second group pixel 112 of FIG. 2). In a description of FIG. 4, details duplicated by the description of FIG. 3 may be omitted.

According to an embodiment, in the non-security image 410, pixel data may be read out in a different manner from security images 310 and 320 shown in FIG. 3. For example, in the security images 310 and 320, pixel data may be read out in a full pixel mode of obtaining data from each pixel. In the non-security image 410, pixel data may be read out in a pixel binning mode of compressing at least one pixel data in a first group pixel 111 of FIG. 2 and at least one pixel data in a second group pixel 112 of FIG. 2 as one pixel data. For example, as shown in FIG. 4, data obtained from two pixels in the first group pixel 111 and data obtained from two pixels in the second group pixel 112 may be compressed as one pixel data. The one compressed pixel data may be data which does not need security.

According to an embodiment, because the pixel data is read out in the pixel binning mode, the non-security image 410 may result in a more deterioration in image quality than the security images 310 and 320. In this case, because the non-security image 410 does not have image quality which is suitably high to obtain information of an iris although it is an image obtained by capturing the image of the iris, it may fail to need security. As a result, although a non-security processing module 132 of FIG. 2 obtains an iris image, security for information of the iris may be maintained.

According to an embodiment, the non-security image 410 may include depth information about an external object. An electronic device 100 of FIG. 2 may use the non-security image 410 in various manners in various applications. For example, the electronic device 100 may provide a focus change effect on the non-security image 410 including the depth information. For another example, the electronic device 100 may provide various 3D effects using the non-security image 410.

Figure 5:
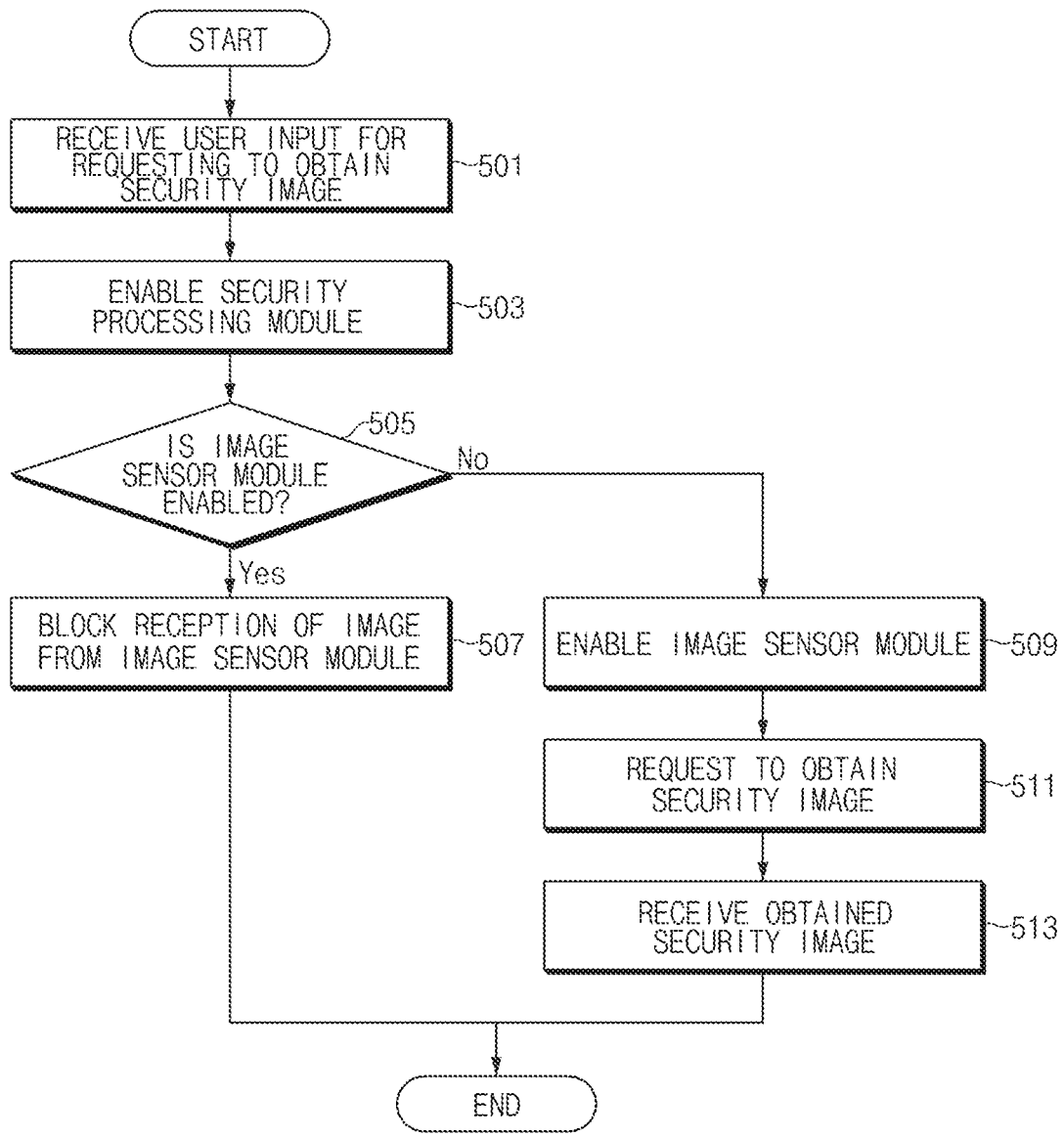
FIG. 5 illustrates a flowchart of a process of obtaining a security image in an electronic device according to an embodiment.

FIG. 5 illustrates a flowchart of a process of obtaining a security image in an electronic device according to an embodiment.

Referring to FIG. 5, operations 501 to 513 indicate a method for obtaining a security image in an electronic device (e.g., an electronic device 100 of FIG. 2).

In operation 501, the electronic device 100 (or a processor (e.g., a processor 130 of FIG. 2)) may receive a user input for requesting to obtain a security image. For example, the electronic device 100 may receive a user input by means of a specified application necessary to obtain the security image, for example, a payment application. The user input may be, for example, a touch input of a user to a specified content associated with payment approval.

In operation 503, the electronic device 100 may enable a security processing module (e.g., a security processing module 131 of FIG. 2). When the electronic device 100 does not perform an operation which needs security, it may keep the security processing module 131 inactive. However, when the electronic device 100 wants to perform an operation which needs security in operation 501, it may enable the security processing module 131. The electronic device 100 may prepare to obtain a security image by enabling the security processing module 131.

In operation 505, the enabled security processing module 131 may determine whether an image sensor module (e.g., an image sensor module 110 of FIG. 2) is enabled. For example, the security processing module 131 may determine whether the image sensor module 110 is enabled using a first state interface (e.g., a first state interface 221 of FIG. 2). For another example, the electronic device 100 may determine whether the image sensor module 110 is enabled in parallel using the first state interface 221 and a second state interface (e.g., a second state interface 222 of FIG. 2).

According to an embodiment, operation 505 may be an operation for determining the possibility of hacking. For example, when a non-security processing module (e.g., a non-security processing module 132 of FIG. 2) is hacked at a time when an application which needs security is executed in operation 501, a hacker may attempt to enable the image sensor module 110 and obtain a security image by means of privileges of the non-security processing module 132. When the image sensor module 110 is already enabled before being enabled by the security processing module 131, the electronic device 100 may determine that there is the possibility of hacking.

When the image sensor module 110 is enabled, the electronic device 100 may perform operation 507. When the image sensor module 110 is disabled, the electronic device 100 may perform operation 509.

As it is determined that there is the possibility of hacking as a result of the determination in operation 505, in operation 507, the security processing module 131 may block the reception of the image from the image sensor module 110.

In an embodiment, to at least temporarily block the reception of the image from the image sensor module 110, the electronic device 100 may at least temporarily disable or reset the image sensor module 110. For example, the security processing module 131 may deliver a specified instruction to the non-security processing module 132 to disable or reset the image sensor module 110. The non-security processing module 132 may at least temporarily disable or reset the image sensor module 110 using a control interface (e.g., a control interface 230 of FIG. 2) in response to the reception of the instruction. For another example, the security processing module 131 may at least temporarily disable or reset the image sensor module 110 directly using a separate control interface directly electrically connected with the image sensor module 110.

In another embodiment, to at least temporarily block the reception of the image from the image sensor module 110, the electronic device 100 may at least temporarily stop obtaining an image at the image sensor module 110. For example, the security processing module 131 may deliver a specified instruction to the non-security processing module 132 such that the image sensor module 110 does not obtain an image. The non-security processing module 132 may at least temporarily stop obtaining an image at the image sensor module 110 using the control interface 230 in response to the reception of the instruction. For another example, the security processing module 131 may at least temporarily stop obtaining an image at the image sensor module 110 using the separate control interface directly electrically connected with the image sensor module 110.

In another embodiment, to at least temporarily block the reception of the image from the image sensor module 110, the electronic device 100 may at least temporarily disable a first data interface (e.g., a first data interface 211 of FIG. 2) of the image sensor module 110. For example, the security processing module 131 may deliver a specified instruction to the non-security processing module 132 such that the first data interface 211 of the image sensor module 110 is disabled. The non-security processing module 132 may at least temporarily disable the first data interface 211 of the image sensor module 110 using the control interface 230 in response to the reception of the instruction. When the first data interface 211 is disabled, although the image is obtained at the image sensor module 110, transmission to the processor 130 may be blocked. For another example, the security processing module 131 may at least temporarily disable the first data interface 211 of the image sensor module 110 using the separate control interface directly electrically connected with the image sensor module 110.

According to an embodiment, as it is determined that there is the possibility of hacking, the electronic device 100 may output a specified message on a display (e.g., a display 120 of FIG. 2) without obtaining a security image. The specified message may be, for example, a message for providing a notification that an error occurs or requesting to reset the electronic device 100.

When it is determined that the possibility of hacking is low because the image sensor module 110 is disabled, in operation 509, the security processing module 131 may enable the image sensor module 110 to obtain a security image. For example, the security processing module 131 may deliver a specified instruction to the non-security processing module 132 to enable the image sensor module 110. In response to the reception of the instruction, the non-security processing module 132 may enable the image sensor module 110 using the control interface 230. For another example, the security processing module 131 may directly enable the image sensor module 110 using the separate control interface directly electronically connected with the image sensor module 110.

In operation 511, the security processing module 131 may request the image sensor module 110 to obtain a security image. For example, the security processing module 131 may deliver a specified instruction to request the image sensor module 110 to obtain the security image to the non-security processing module 132. The non-security processing module 132 may request the image sensor module 110 to obtain the security image using the control interface 230 in response to the reception of the instruction. For another example, the security processing module 131 may request the image sensor module 110 to obtain the security image using the separate control interface directly electrically connected with the image sensor module 110.

In operation 511, the security processing module 131 may deliver information about an image capture condition of the security image to the image sensor module 110 via the non-security processing module 132 or directly. The information about the image capture condition of the security image may be transmitted via the control interface. The information about the image capture condition may include information, for example, brightness, a focal distance, a shutter speed, or the like.

In operation 513, the security processing module 131 may receive the security image obtained by the image sensor module 110. The security image may be delivered from the image sensor module 110 to the security processing module 131 via the first data interface 211. In an embodiment, the security processing module 131 may perform an operation of authenticating whether a user is a legitimate user (or authorized) user using the received security image. According to various embodiments, the electronic device 100 may perform various operations using the operation of authenticating whether the user is the legitimate (or authorized) user. For example, the electronic device 100 may determine whether to permit payment, may log in to a specified application, or may unlock a screen.

Figure 6:
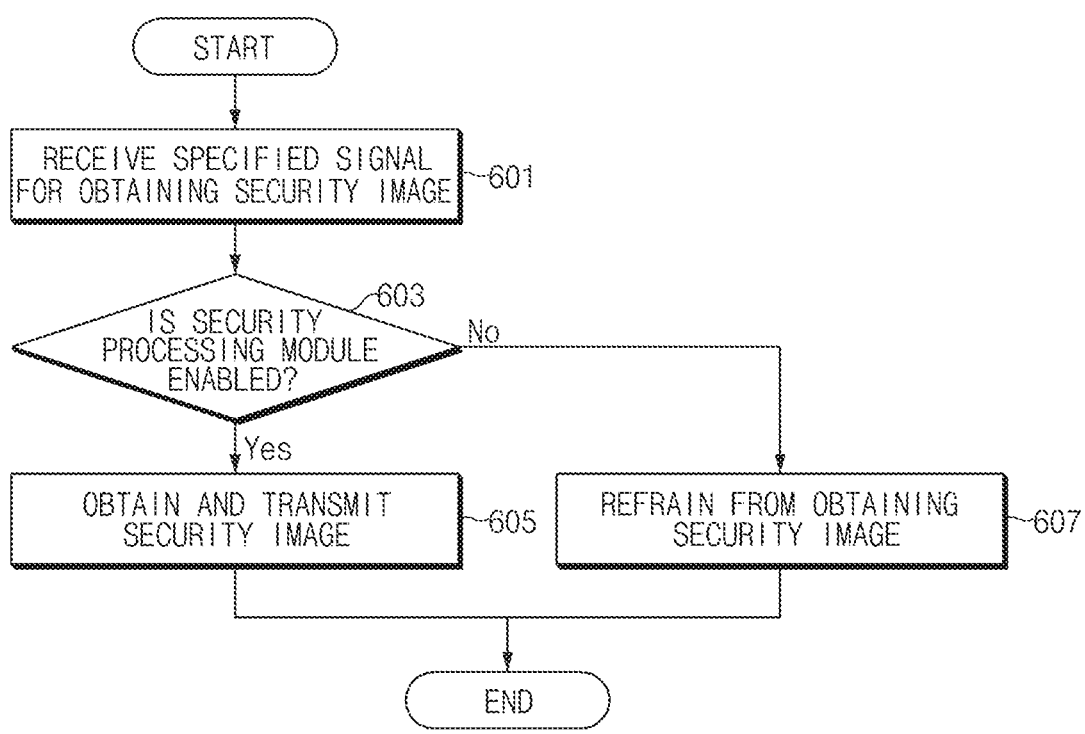
FIG. 6 illustrates a flowchart of a process of obtaining a security image in an electronic device according to another embodiment.

FIG. 6 illustrates a flowchart of a process of obtaining a security image in an electronic device according to another embodiment.

Referring to FIG. 6, operations 601 to 607 indicate a method for obtaining a security image in an electronic device (e.g., an electronic device 100 of FIG. 2). According to an embodiment, operations 601 to 607 may assume at least some of operations shown in FIG. 5 are performed. For example, operations 601 to 607 may assume at least operation 511 among the operations shown in FIG. 5 is performed.

In operation 601, the electronic device 100 (e.g., a processor (e.g., a processor 130 of FIG. 2)), for example, an image sensor module (e.g., an image sensor module 110 of FIG. 2), may receive a specified signal for obtaining a security image. For example, the image sensor module 110 may receive the specified signal from a non-security processing module (e.g., a non-security processing module 132 of FIG. 2) via a control interface (e.g., a control interface 230 of FIG. 2).

According to an embodiment, the specified signal may be a signal received via the control interface 230 based on a request of a security processing module (e.g., a security processing module 131 of FIG. 2). According to another embodiment, the specified signal may be a signal received based on a request of the hacked non-security processing module 132 rather than a request of the security processing module 131.

In operation 603, the image sensor module 110 may determine whether the security processing module 131 is enabled. For example, the image sensor module 110 may determine whether the security processing module 131 is enabled using a first state interface (e.g., a first state interface 221 of FIG. 2). When the security processing module 131 is enabled, the image sensor module 110 may determine the specified signal received in operation 601 as a signal received based on a request of the security processing module 131. When the security processing module 131 is disabled, the image sensor module 110 may determine the specified signal received in operation 601 as a signal received based on the hacked non-security processing module 132 rather than a request of the security processing module 131.

When the security processing module 131 is enabled, the electronic device may perform operation 605. When the security processing module 131 is disabled, the electronic device 100 may perform operation 607.

In operation 605, the electronic device 100, for example, the image sensor module 110, may determine the specified signal received in operation 601 as a legitimate request by the security processing module 131 to obtain a security image. The image sensor module 110 may deliver the obtained security image to the security processing module 131 using the first data interface 211.

In operation 607, the electronic device 100, for example, the image sensor module 110, may determine the specified signal received in operation 601 as a request by the hacked non-security processing module 132 to refrain from obtaining the security image. The electronic device 100 may determine that there is the possibility of hacking.

According to an embodiment, because it is determined that there is the possibility of hacking, the electronic device 100 may output a specified message on a display (e.g., a display 120 of FIG. 2). The specified message may be a message for providing a notification that an error occurs or requesting to reset the electronic device 100.

FIG. 7 illustrates a block diagram of an electronic device in a network environment, according to various embodiments.

Referring to FIG. 7, the electronic device 701 in the network environment 700 may communicate with an electronic device 702 via a first network 798 (e.g., a short-range wireless communication network), or an electronic device 704 or a server 708 via a second network 799 (e.g., a long-range wireless communication network). According to an embodiment, the electronic device 701 may communicate with the electronic device 704 via the server 708. According to an embodiment, the electronic device 701 may include a processor 720, memory 730, an input device 750, a sound output device 755, a display device 760, an audio module 770, a sensor module 776, an interface 777, a haptic module 779, a camera module 780, a power management module 788, a battery 789, a communication module 790, a subscriber identification module (SIM) 796, or an antenna module 797. In some embodiments, at least one (e.g., the display device 760 or the camera module 780) of the components may be omitted from the electronic device 701, or one or more other components may be added in the electronic device 701. In some embodiments, some of the components may be implemented as single integrated circuitry. For example, the sensor module 776 (e.g., a fingerprint sensor, an iris sensor, or an illuminance sensor) may be implemented as embedded in the display device 760 (e.g., a display).

The processor 720 may execute, for example, software (e.g., a program 740) to control at least one other component (e.g., a hardware or software component) of the electronic device 701 coupled with the processor 720, and may perform various data processing or computation. According to one embodiment, as at least part of the data processing or computation, the processor 720 may load a command or data received from another component (e.g., the sensor module 776 or the communication module 790) in volatile memory 732, process the command or the data stored in the volatile memory 732, and store resulting data in non-volatile memory 734. According to an embodiment, the processor 720 may include a main processor 721 (e.g., a central processing unit (CPU) or an application processor (AP)), and an auxiliary processor 723 (e.g., a graphics processing unit (GPU), an image signal processor (ISP), a sensor hub processor, or a communication processor (CP)) that is operable independently from, or in conjunction with, the main processor 721. Additionally, or alternatively, the auxiliary processor 723 may be adapted to consume less power than the main processor 721, or to be specific to a specified function. The auxiliary processor 723 may be implemented as separate from, or as part of the main processor 721.

The auxiliary processor 723 may control at least some of functions or states related to at least one component (e.g., the display device 760, the sensor module 776, or the communication module 790) among the components of the electronic device 701, instead of the main processor 721 while the main processor 721 is in an inactive (e.g., sleep) state, or together with the main processor 721 while the main processor 721 is in an active state (e.g., executing an application). According to an embodiment, the auxiliary processor 723 (e.g., an image signal processor or a communication processor) may be implemented as part of another component (e.g., the camera module 780 or the communication module 790) functionally related to the auxiliary processor 723.

The memory 730 may store various data used by at least one component (e.g., the processor 720 or the sensor module 776) of the electronic device 701. The various data may include, for example, software (e.g., the program 740) and input data or output data for a command related thererto. The memory 730 may include the volatile memory 732 or the non-volatile memory 734.

The program 740 may be stored in the memory 730 as software, and may include, for example, an operating system (OS) 742, middleware 744, or an application 746.

The input device 750 may receive a command or data to be used by other component (e.g., the processor 720) of the electronic device 701, from the outside (e.g., a user) of the electronic device 701. The input device 750 may include, for example, a microphone, a mouse, or a keyboard.

The sound output device 755 may output sound signals to the outside of the electronic device 701. The sound output device 755 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 760 may visually provide information to the outside (e.g., a user) of the electronic device 701. The display device 760 may include, for example, a display, a hologram device, or a projector and control circuitry to control a corresponding one of the display, hologram device, and projector. According to an embodiment, the display device 760 may include touch circuitry adapted to detect a touch, or sensor circuitry (e.g., a pressure sensor) adapted to measure the intensity of force incurred by the touch.

The audio module 770 may convert a sound into an electrical signal and vice versa. According to an embodiment, the audio module 770 may obtain the sound via the input device 750, or output the sound via the sound output device 755 or a headphone of an external electronic device (e.g., an electronic device 702) directly (e.g., wiredly) or wirelessly coupled with the electronic device 701.

The sensor module 776 may detect an operational state (e.g., power or temperature) of the electronic device 701 or an environmental state (e.g., a state of a user) external to the electronic device 701, and then generate an electrical signal or data value corresponding to the detected state. According to an embodiment, the sensor module 776 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 777 may support one or more specified protocols to be used for the electronic device 701 to be coupled with the external electronic device (e.g., the electronic device 702) directly (e.g., wiredly) or wirelessly. According to an embodiment, the interface 777 may include, for example, a high definition multimedia interface (HDMI), a universal serial bus (USB) interface, a secure digital (SD) card interface, or an audio interface.

A connecting terminal 778 may include a connector via which the electronic device 701 may be physically connected with the external electronic device (e.g., the electronic device 702). According to an embodiment, the connecting terminal 778 may include, for example, a HDMI connector, a USB connector, a SD card connector, or an audio connector (e.g., a headphone connector), The haptic module 779 may convert an electrical signal into a mechanical stimulus (e.g., a vibration or a movement) or electrical stimulus which may be recognized by a user via his tactile sensation or kinesthetic sensation. According to an embodiment, the haptic module 779 may include, for example, a motor, a piezoelectric element, or an electric stimulator.

The camera module 780 may capture a still image or moving images. According to an embodiment, the camera module 780 may include one or more lenses, image sensors, image signal processors, or flashes.

The power management module 788 may manage power supplied to the electronic device 701. According to one embodiment, the power management module 788 may be implemented as at least part of, for example, a power management integrated circuit (PMIC).

The battery 789 may supply power to at least one component of the electronic device 701. According to an embodiment, the battery 789 may include, for example, a primary cell which is not rechargeable, a secondary cell which is rechargeable, or a fuel cell.

The communication module 790 may support establishing a direct (e.g., wired) communication channel or a wireless communication channel between the electronic device 701 and the external electronic device (e.g., the electronic device 702, the electronic device 704, or the server 708) and performing communication via the established communication channel. The communication module 790 may include one or more communication processors that are operable independently from the processor 720 (e.g., the application processor (AP)) and supports a direct (e.g., wired) communication or a wireless communication. According to an embodiment, the communication module 790 may include a wireless communication module 792 (e.g., a cellular communication module, a short-range wireless communication module, or a global navigation satellite system (GNSS) communication module) or a wired communication module 794 (e.g., a local area network (LAN) communication module or a power line communication (PLC) module). A corresponding one of these communication modules may communicate with the external electronic device via the first network 798 (e.g., a short-range communication network, such as Bluetooth™, wireless-fidelity (Wi-Fi) direct, or infrared data association (IrDA)) or the second network 799 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 792 may identify and authenticate the electronic device 701 in a communication network, such as the first network 798 or the second network 799, using subscriber information (e.g., international mobile subscriber identity (IMSI)) stored in the subscriber identification module 796.

The antenna module 797 may transmit or receive a signal or power to or from the outside (e.g., the external electronic device) of the electronic device 701. According to an embodiment, the antenna module 797 may include one or more antennas, and, therefrom, at least one antenna appropriate for a communication scheme used in the communication network, such as the first network 798 or the second network 799, may be selected, for example, by the communication module 790 (e.g., the wireless communication module 792). The signal or the power may then be transmitted or received between the communication module 790 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 701 and the external electronic device 704 via the server 708 coupled with the second network 799. Each of the electronic devices 702 and 704 may be a device of a same type as, or a different type, from the electronic device 701. According to an embodiment, all or some of operations to be executed at the electronic device 701 may be executed at one or more of the external electronic devices 702, 704, or 708. For example, if the electronic device 701 should perform a function or a service automatically, or in response to a request from a user or another device, the electronic device 701, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 701. The electronic device 701 may provide the outcome, with or without further processing of the outcome, as at least part of a reply to the request. To that end, a cloud computing, distributed computing, or client-server computing technology may be used, for example.

Figure 8:
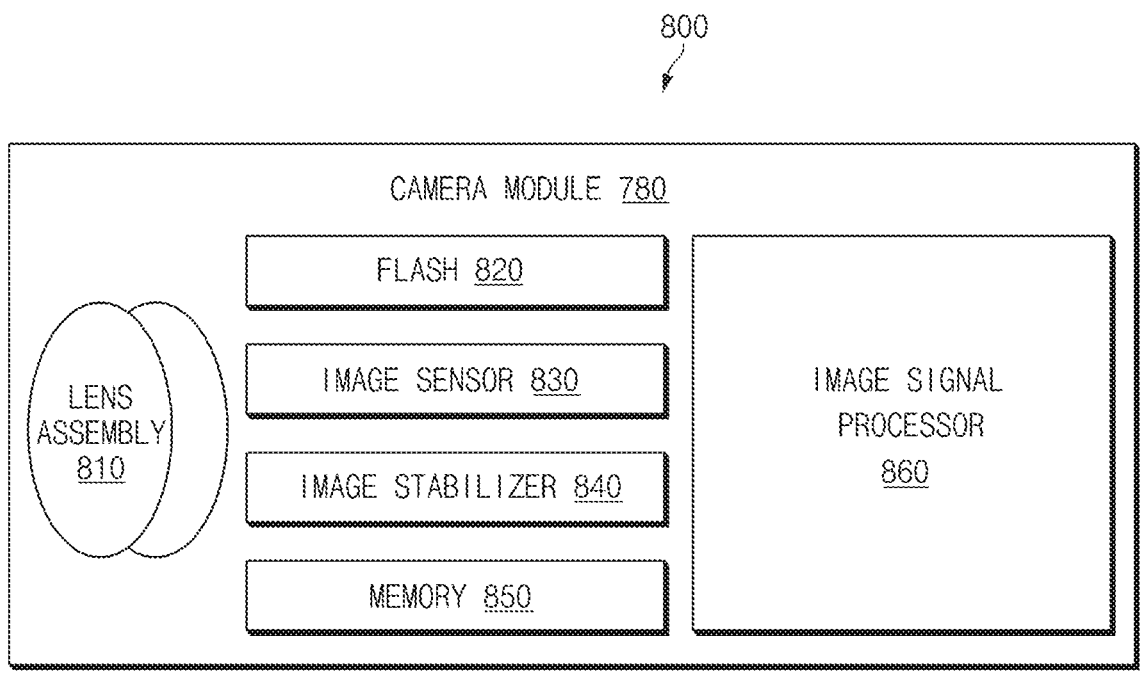
FIG. 8 illustrates a block diagram of a camera module according to various embodiments.

FIG. 8 illustrates a block diagram of a camera module according to various embodiments.

Referring to FIG. 8, the camera module 780 may include a lens assembly 810, a flash 820, an image sensor 830, an image stabilizer 840, memory 850 (e.g., buffer memory), or an image signal processor 860. The lens assembly 810 may collect light emitted or reflected from an object whose image is to be taken. The lens assembly 810 may include one or more lenses. According to an embodiment, the camera module 780 may include a plurality of lens assemblies 810. In such a case, the camera module 780 may form, for example, a dual camera, a 360-degree camera, or a spherical camera. Some of the plurality of lens assemblies 810 may have the same lens attribute (e.g., view angle, focal length, auto-focusing, f number, or optical zoom), or at least one lens assembly may have one or more lens attributes different from those of another lens assembly. The lens assembly 810 may include, for example, a wide-angle lens or a telephoto lens.

The flash 820 may emit light that is used to reinforce light reflected from an object. According to an embodiment, the flash 820 may include one or more light emitting diodes (LEDs) (e.g., a red-green-blue (RGB) LED, a white LED, an infrared (IR) LED, or an ultraviolet (UV) LED) or a xenon lamp. The image sensor 830 may obtain an image corresponding to an object by converting light emitted or reflected from the object and transmitted via the lens assembly 810 into an electrical signal. According to an embodiment, the image sensor 830 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 830 may be implemented using, for example, a charged coupled device (CCD) sensor or a complementary metal oxide semiconductor (CMOS) sensor.

The image stabilizer 840 may move the image sensor 830 or at least one lens included in the lens assembly 810 in a particular direction, or control an operational attribute (e.g., adjust the read-out timing) of the image sensor 830 in response to the movement of the camera module 780 or the electronic device 701 including the camera module 780. This allows compensating for at least part of a negative effect (e.g., image blurring) by the movement on an image being captured. According to an embodiment, the image stabilizer 840 may sense such a movement by the camera module 780 or the electronic device 701 using a gyro sensor (not shown) or an acceleration sensor (not shown) disposed inside or outside the camera module 780. According to an embodiment, the image stabilizer 840 may be implemented, for example, as an optical image stabilizer.

The memory 850 may store, at least temporarily, at least part of an image obtained via the image sensor 830 for a subsequent image processing task. For example, if image capturing is delayed due to shutter lag or multiple images are quickly captured, a raw image obtained (e.g., a Bayer-patterned image, a high-resolution image) may be stored in the memory 850, and its corresponding copy image (e.g., a low-resolution image) may be previewed via the display device 760. Thereafter, if a specified condition is met (e.g., by a user's input or system command), at least part of the raw image stored in the memory 850 may be obtained and processed, for example, by the image signal processor 860. According to an embodiment, the memory 850 may be configured as at least part of the memory 730 or as a separate memory that is operated independently from the memory 730.

The image signal processor 860 may perform one or more image processing with respect to an image obtained via the image sensor 830 or an image stored in the memory 850. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 860 may perform control (e.g., exposure time control or read-out timing control) with respect to at least one (e.g., the image sensor 830) of the components included in the camera module 780. An image processed by the image signal processor 860 may be stored back in the memory 850 for further processing, or may be provided to an external component (e.g., the memory 730, the display device 760, the electronic device 702, the electronic device 704, or the server 708) outside the camera module 780. According to an embodiment, the image signal processor 860 may be configured as at least part of the processor 720, or as a separate processor that is operated independently from the processor 720. If the image signal processor 860 is configured as a separate processor from the processor 720, at least one image processed by the image signal processor 860 may be displayed, by the processor 720, via the display device 760 as it is or after being further processed.

According to an embodiment, the electronic device 701 may include a plurality of camera modules 780 having different attributes or functions. In such a case, at least one of the plurality of camera modules 780 may form, for example, a wide-angle camera and at least another of the plurality of camera modules 780 may form a telephoto camera. Similarly, at least one of the plurality of camera modules 780 may form, for example, a front camera and at least another of the plurality of camera modules 780 may form a rear camera.

An electronic device according to an embodiment may include an image sensor module configured to include a first group pixel capable of obtaining data corresponding to a first wavelength band and a second group pixel capable of obtaining data corresponding to a second wavelength band and obtain a security image or a non-security image using the first group pixel and the second group pixel and a processor configured to include a security processing module and a non-security processing module, which are electrically connected with the image sensor module.

According to an embodiment, the processor may be configured to receive a first user input for requesting to obtain the security image for an external object by means of a first application, enable the security processing module based on the received first user input, determine whether the image sensor module is enabled using the enabled security processing module, a result of the determination that the image sensor module is enabled, at least temporarily block reception of an image from the image sensor module, and, as a result of the determination that the image sensor module is disabled, enable the image sensor module using the enabled security processing module, request the image sensor module to obtain the security image for the external object, and receive the security image for the external object, the security image being obtained from the image sensor module.

According to an embodiment, the electronic device may further include a light source unit configured to emit an infrared ray of the first wavelength band to the outside. The processor may be configured to, as a result of the determination that the image sensor module is disabled, control the light source unit to emit the infrared ray to the outside, based on enabling the image sensor module.

According to an embodiment, the security image may at least include data obtained from the first group pixel.

According to an embodiment, the electronic device may further include a control interface configured to electronically connect the processor and the image sensor module. The processor may be configured to enable or disable the image sensor module using the control interface.

According to an embodiment, the electronic device may further include a first data interface configured to electrically connect the security processing module and the image sensor module. The processor may be configured to receive the obtained security image via the first data interface.

In an embodiment, the processor may be configured to at least temporarily disable the first data interface of the image sensor module to at least temporarily block the reception of the image from the image sensor module when the image sensor module is enabled.

According to an embodiment, the electronic device may further include a first state interface configured to electrically connect the security processing module and the image sensor module. The processor may be configured to determine whether the image sensor module is enabled via the first state interface.

In an embodiment, the electronic device may further include a second state interface configured to electrically connect the non-security processing module, the security processing module, and the image sensor module. The processor may be configured to determine whether the image sensor module is enabled in parallel via the first state interface and the second state interface.

According to an embodiment, the first wavelength band and the second wavelength band may differ from each other.

According to an embodiment, the processor may be configured to receive a second user input for requesting to obtain the non-security image for the external object by means of a second application, enable the image sensor module using the non-security processing module based on the received second user input, request the image sensor module to obtain the non-security image for the external object, and receive the non-security image for the external object, the non-security image being obtained from the image sensor module.

In an embodiment, the processor may be configured to obtain an image binned using at least one pixel in the first group pixel and at least one pixel in the second group pixel as the non-security image.

In an embodiment, the electronic device may further include a second data interface configured to electrically connect the non-security processing module and the image sensor module. The processor may be configured to receive the obtained non-security image via the second data interface.

According to an embodiment, the processor may be configured to at least temporarily disable the image sensor module to at least temporarily block the reception of the image from the image sensor module when the image sensor module is enabled.

According to an embodiment, the processor may be configured to at least temporarily reset the image sensor module to at least temporarily block the reception of the image from the image sensor module when the image sensor module is enabled.

According to an embodiment, the processor may be configured to at least temporarily stop obtaining the image at the image sensor module to at least temporarily block the reception of the image from the image sensor module when the image sensor module is enabled.

An electronic device according to an embodiment may include an image sensor module configured to include a first group pixel capable of obtaining data corresponding to a first wavelength band and a second group pixel capable of obtaining data corresponding to a second wavelength band and obtain a security image or a non-security image using the first group pixel and the second group pixel and a processor configured to include a security processing module and a non-security processing module, which are electrically connected with the image sensor module.

In an embodiment, the image sensor module may be configured to receive a specified signal for obtaining the security image for an external object from the processor, determine whether the security processing module is enabled, based on the received specified signal, as a result of the determination that the security processing module is enabled, obtain the security image for the external object, deliver the obtained security image to the security processing module, and, as a result of the determination that the security processing module is disabled, refrain from obtaining the security image for the external object.

According to an embodiment, the security image may at least include data obtained from the first group pixel.

According to an embodiment, the non-security image may be obtained through binning using at least one pixel in the first group pixel and at least one pixel in the second group pixel.

According to an embodiment, the electronic device may further include a first data interface configured to electrically connect the security processing module and the image sensor module. The image sensor module may be configured to deliver the obtained security image via the first data interface.

According to an embodiment, the electronic device may further include a first state interface configured to electrically connect the security processing module and the image sensor module. The image sensor module may be configured to determine whether the security processing module is enabled via the first state interface.

According to embodiments disclosed in the disclosure, because both the security processing module and the non-security processing module obtain an image using the image sensor module for security, the utility of the image sensor module for security may be increased. For example, the security processing module may obtain a security image using the image sensor module for security, and the non-security processing module may obtain a non-security image using the image sensor module for security. Furthermore, at the same time, the security of the security image obtained by the image sensor module for security may be maintained. As a result, the user may use the electronic device more broadly and securely.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance.

According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 740) including one or more instructions that are stored in a storage medium (e.g., internal memory 736 or external memory 738) that is readable by a machine (e.g., the electronic device 701). For example, a processor (e.g., the processor 720) of the machine (e.g., the electronic device 701) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively, or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments disclosed in the disclosure, the electronic device may increase the utility of the image sensor module for security. Furthermore, because hacking for a security image obtained using the image sensor module for security is prevented, the security of the electronic device may be maintained. As a result, the user may use the electronic device more safely. In addition, various effects directly or indirectly ascertained through the disclosure may be provided.

While the disclosure has been shown and described with reference to various embodiments thereof, it will be understood by those skilled in the art that various changes in form and details may be made therein without departing from the spirit and scope of the disclosure as defined by the appended claims and their equivalents.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device, comprising:
    an image sensor configured to include a first group pixel capable of obtaining data corresponding to a first wavelength band and a second group pixel capable of obtaining data corresponding to a second wavelength band and obtain a security image or a non-security image using the first group pixel and the second group pixel; and
    a processor configured to include a security processing module and a non-security processing module, which are electrically connected with the image sensor,
    wherein the processor is configured to:
        receive a first user input for requesting to obtain the security image for an external object by executing a first application;
        enable the security processing module based on the received first user input;
        determine whether the image sensor is enabled using the enabled security processing module;

in response to determining that the image sensor is enabled, at least temporarily block reception of an image from the image sensor; and in response to determining that the image sensor is disabled:
enable the image sensor using the enabled security processing module,
request the image sensor to obtain the security image for the external object, and
receive the security image for the external object, the security image being obtained from the image sensor.

2. The electronic device of claim 1, further comprising:
a light source configured to emit an infrared ray of the first wavelength band,
wherein in response to determining that the image sensor is disabled, the processor is configured to control the light source to emit the infrared ray, based on enabling the image sensor.

3. The electronic device of claim 1, wherein the security image includes data obtained from the first group pixel.

4. The electronic device of claim 1, wherein:
the processor is operably connected to the image sensor, and
the processor is configured to enable or disable the image sensor.

5. The electronic device of claim 1, wherein:
the security processing module is connected to the image sensor using a first connection, and
wherein the processor is configured to receive the obtained security image via the first connection.

6. The electronic device of claim 5, wherein the processor is configured to:
at least temporarily disable the first connection of the image sensor to at least temporarily block the reception of the image from the image sensor when the image sensor is enabled.

7. The electronic device of claim 1, wherein:
the security processing module is connected to the image sensor using a second connection,
the processor is configured to determine whether the image sensor is enabled via the second connection.

8. The electronic device of claim 7, wherein:
the non-security processing module is connected to the security processing module and the image sensor using a third connection,
the processor is configured to determine whether the image sensor is enabled in parallel via the second connection and the third connection.

9. The electronic device of claim 1, wherein the first wavelength band and the second wavelength band differ from each other.

10. The electronic device of claim 1, wherein the processor is configured to:
receive a second user input for requesting to obtain the non-security image for the external object by executing a second application;
enable the image sensor using the non-security processing module based on the received second user input, to obtain the non-security image for the external object; and
receive the non-security image for the external object, the non-security image being obtained from the image sensor.

11. The electronic device of claim 10, wherein the processor is configured to:
obtain binned image using at least one pixel in the first group pixel and at least one pixel in the second group pixel as the non-security image.

12. The electronic device of claim 10, wherein:
the non-security processing module is connected to the image sensor using a fourth connection, and
the processor is configured to receive the obtained non-security image via the fourth connection.

13. The electronic device of claim 1, wherein the processor is configured to:
at least temporarily disable the image sensor to at least temporarily block the reception of the image from the image sensor when the image sensor is enabled.

14. The electronic device of claim 1, wherein the processor is configured to:
at least temporarily reset the image sensor to at least temporarily block the reception of the image from the image sensor when the image sensor is enabled.

15. The electronic device of claim 1, wherein the processor is configured to:
at least temporarily stop obtaining the image at the image sensor to at least temporarily block the reception of the image from the image sensor when the image sensor is enabled.

16. An electronic device, comprising:
an image sensor configured to include a first group pixel capable of obtaining data corresponding to a first wavelength band and a second group pixel capable of obtaining data corresponding to a second wavelength band and obtain a security image or a non-security image using the first group pixel and the second group pixel; and
a processor configured to include a security processing module and a non-security processing module, which are electrically connected with the image sensor,
wherein the image sensor is configured to:
receive a specified signal for obtaining the security image for an external object from the processor;
determine whether the security processing module is enabled, based on the received specified signal;
in response to determining that the security processing module is enabled, obtain the security image for the external object and deliver the obtained security image to the security processing module; and
in response to determining that the security processing module is disabled, refrain from obtaining the security image for the external object.

17. The electronic device of claim 16, wherein the security image at least includes data obtained from the first group pixel.

18. The electronic device of claim 16, wherein the non-security image is obtained through binning using at least one pixel in the first group pixel and at least one pixel in the second group pixel.

19. The electronic device of claim 16, wherein:
the security processing module is connected to the image sensor using a first connection,
the image sensor is configured to deliver the obtained security image via the first connection.

20. The electronic device of claim 16, wherein:
the security processing module is connected to the image sensor using a second connection,
the image sensor is configured to determine whether the security processing module is enabled via the second connection.

* * * * *